J. D. PIERCE.
SLOP TRAP.
No. 183,701.　　　　　　　Patented Oct. 24, 1876.
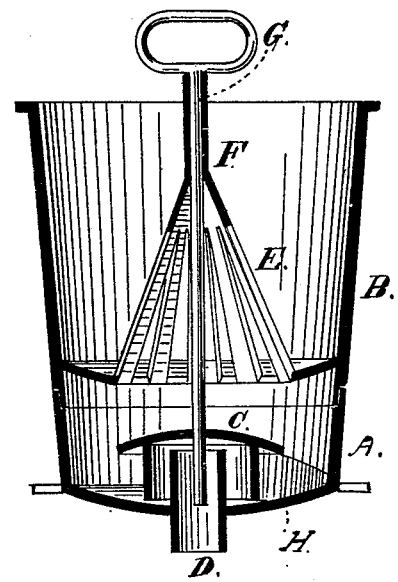
WITNESSES:　　　　　　　INVENTOR:

UNITED STATES PATENT OFFICE.

JAMES D. PIERCE, OF MILWAUKEE, WISCONSIN, ASSIGNOR OF ONE-HALF HIS RIGHT TO JOHN B. SMITH, OF SAME PLACE.

IMPROVEMENT IN SLOP-TRAPS.

Specification forming part of Letters Patent No. 183,701, dated October 24, 1876; application filed April 6, 1876.

*To all whom it may concern:*

Be it known that I, JAMES D. PIERCE, of Milwaukee, in the county of Milwaukee, in the State of Wisconsin, have invented certain Improvements in Slop-Traps, of which the following is a specification:

The object of my invention is to provide a trap for the receptacle of slops and débris at the mouth of drains.

It is a trap with the bottom part of same made like the ordinary traps in use, with a top that sits on the bottom, and with a raised slatted center, through which the waste will flow, and a cover which sits over the pipe or opening in the lower portion of the trap, and connected to a rod which passes up through the center of the slatted bottom, and through a tube on the top of same, with a handle on the top of said rod. This handle is for the purpose of lifting the top of the trap and emptying same of the débris that may accumulate in the upper portion of the trap.

Figure 1 is a sectional view of my invention.

A is the bottom portion of the trap; B, the upper portion setting on the lower portion; C, the cover which sits on over the pipe D, and the water, passing under the lower ledge of the cover and up over pipe D, forms a trap; E, the inner portion of top B, slatted, forming openings for the water to pass through. F is a tube which passes up from the top of slatted portion E, through which passes up the rod G from the cover C. H is a wing on the side of cover C, with which the grease or other débris may be stirred up and cleared out by revolving the cover C.

When it is necessary to empty the débris out of the top B, take hold of the handle on the top of rod G and lift the top B off of bottom A, and the cover C will be raised up and close the opening in the bottom of top B; and when the bottom gets clogged with grease or other substance, take hold of handle G and turn same round and round, and the grease will be stirred up and pass out through pipe D.

I claim as new in my invention—

1. Bottom A, top B, slatted portion E in top B, and tube F, in combination with cover C and handle G, substantially as specified.

2. Cover C, wing H, and rod G, in combination with bottom A and pipe D, substantially as specified.

JAMES D. PIERCE.

Witnesses:
J. B. SMITH,
E. J. SMITH.